Feb. 20, 1923.
H. W. ALDEN.
DIFFERENTIAL CONSTRUCTION.
FILED JUNE 29, 1921.
1,445,864.
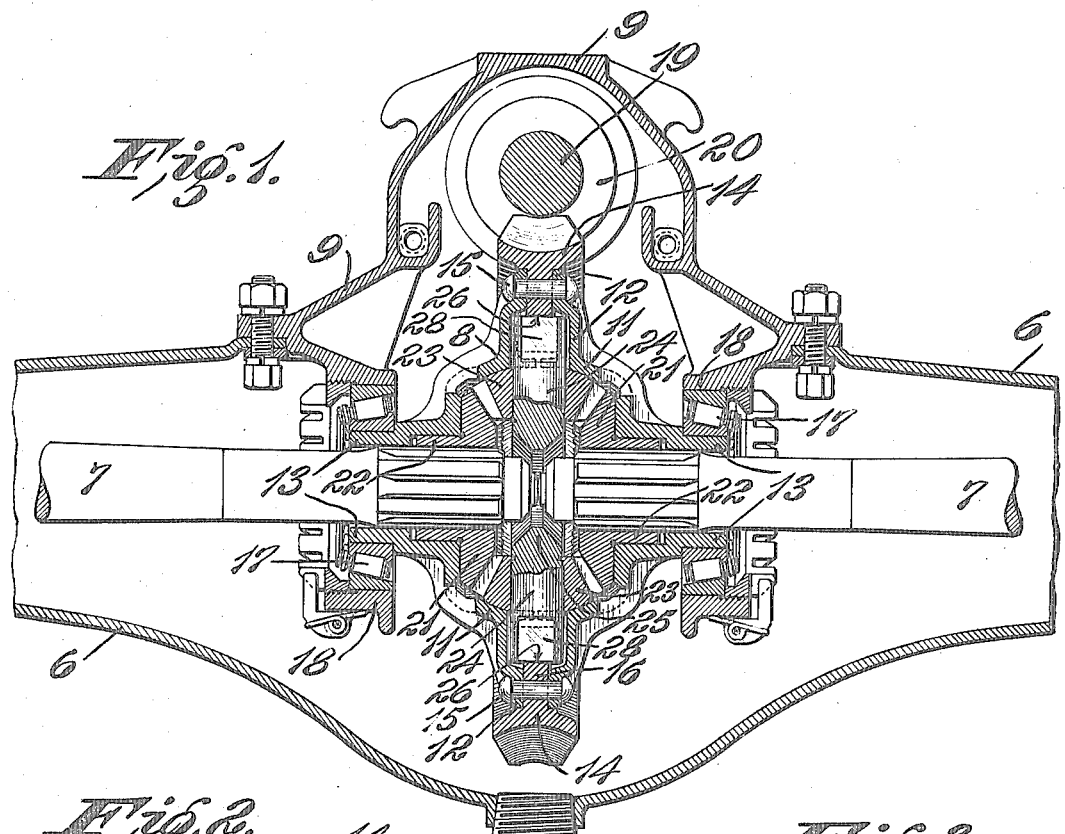
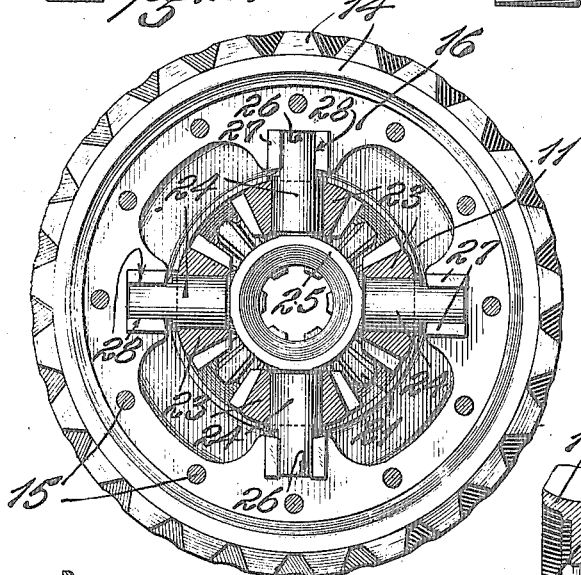
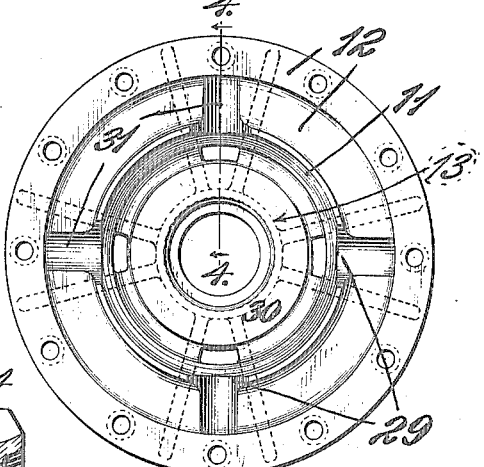
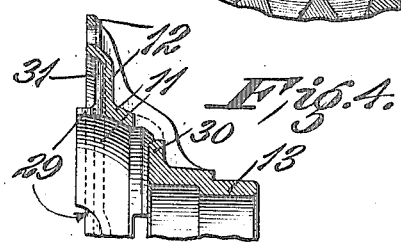
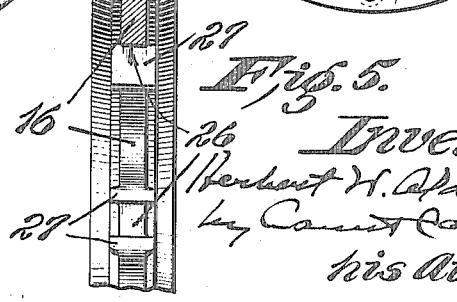
Inventor:
Herbert W. Alden,
his Attorneys Patented Feb. 20, 1923.

1,445,864

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

DIFFERENTIAL CONSTRUCTION.

Application filed June 29, 1921. Serial No. 481,293.

*To all whom it may concern:*

Be it known that I, HERBERT W. ALDEN, a citizen of the United States, and a resident of the city of Detroit, in the county of Wayne and State of Michigan, have invented a new and useful Improvement in Differential Constructions, of which the following is a specification.

This invention relates to differential constructions for the driving axles of motor vehicles and particularly to the manner of mounting the differential pinions.

One of the principal objects of the present invention is to provide for free movement of the differential pinions longitudinally of the axle, whereby said pinions are adapted to be guided into proper working position by the two differential side gears and are thus automatically centered therebetween.

Another object is to transmit the driving strains from the differential driving gear directly to the differential pinions, whereby the rivets which secure the driving gear to the differential case are relieved of such strains and the use of a light weight differential case is permitted. Other objects are to simplify the construction, to reduce the cost of manufacture, to facilitate assembly, and to obtain other advantages hereinafter appearing.

The invention consists principally in the hereinafter described mechanism for attaining the above mentioned objects; and it also consists in the combinations and arrangements of parts hereinafter described and claimed.

In the accompanying drawing wherein like reference numerals refer to like parts wherever they occur, Fig. 1 is a vertical central longitudinal section through the middle portion of a driving axle provided with a differential construction embodying my invention;

Fig. 2 is a vertical central cross-section through the differential case, the spider and driving gear being shown in elevation;

Fig. 3 is an inside face view of one of the half-sections of the differential gear case;

Fig. 4 is a fragmentary axial section through one of said half-sections on the line 4—4 in Fig. 3; and Fig. 5 is a fragmentary cross-section through the driving gear, the section being taken through one of the slideways which receive the outer ends of the studs of the differential spider.

The driving axle shown in the accompanying drawing comprises a tubular axle housing 6, within which are mounted driving shaft sections 7 disposed with their inner ends abutting and having road wheels (not shown) fixed to their outer ends. The middle portion of the axle housing is enlarged to provide space for a differential gear case 8, and said enlarged portion is provided at its top with an opening, whereby said case may be inserted and withdrawn. Said opening is closed by means of a gear carrier 9, which is bolted or otherwise removably secured to the top of the housing.

The differential gear case 8 comprises duplicate half-sections, in the form of substantially hemispherical shells 11, which are provided with offset circumferential flanges 12 disposed perpendicularly to the axle. The half-sections are also provided with oppositely extending annular hub portions 13 which loosely surround the driving shafts and are disposed concentric therewith. The driving member of the differential gear comprises a worm gear ring 14 which is positioned between the opposed circumferential flanges 12 of the half-sections 11. The half-sections are firmly held together with the gear ring 14 therebetween by means of rivets 15 which pass through the flanges 12 and an annular web portion 16 of said gear.

The tubular hub portions 13 of the differential case are rotatably supported in roller bearings 17 that are disposed in axial alinement with the driving shafts 7 and are mounted in depending pedestals or journal boxes 18 of the gear carrier 9. The differential case is rotated about the axis of the driving shafts by means of a worm drive shaft 19, which is disposed at right angles to said driving shafts and has a worm 20 formed thereon which meshes with the worm gear ring 14 fixed to said case. The worm drive shaft is journaled in bearings mounted in the upper portion of the gear carrier and is adapted to be connected with the usual changeable speed transmission gear (not shown).

Within the gear case 10 are located the two driven side gears 21 of the differential gear. The side gears 21 are formed with oppositely extending hub portions 22 which are rotatably supported in annular recesses formed in the hub portions of the differential case; and said hubs have longitudinal slots or keyways formed therein adapted to cooperate with corresponding portions of the driving shafts whereby said shafts are adapted to be driven by said gears and are removable axially therefrom.

The two bevel side gears 21 of the differential gear mesh with a series of bevel differential pinions 23 located between said side gears. The pinions 23 are journaled on the radially extending arbor or spindle portions 24 of a differential spider 25 which loosely surrounds the inner ends of the driving shafts. The free end portions of the spindle portions 24 of the spider 25 are adapted to fit into a series of square notches 26 formed in the inner periphery of the web portion 16 of the worm gear ring 14, whereby said spider is adapted to rotate with said gear ring to cause the pinions 23 to travel in a circle about the center of the axle. These notches 26 extend parallel to the axis of the gear ring, and said gear ring is provided on opposite sides of said notches with lugs 27 which constitute extensions of the side walls of the notches and form slideways for the spindle portions of the spider 25. The sides of the spindles 24 adjacent to the guide lugs 27 have reduced flat sides 28, whereby the spider is prevented from turning in the slideways 26 and a flat driving surface is provided.

Movement of the pinions 23 toward and away from the axis of the axle is limited by the hemispherical walls of the half sections and by the bosses at the base of the spindles 24, respectively. The adjoining edges of said walls are provided with semicircular recesses 29 which straddle the opposite sides of the spindles and serve to hold the same in position to engage the notches 26 in the worm gear ring during the assembling of said gear ring and the half-sections, which parts constitute the differential case. Movement of the side gears 21 away from each other is limited by annular shoulders 30 formed in the reduced ends of the half-sections. The opposed circumferential flanges 12 of the half-sections 11 are provided opposite the flat faces of the spindles with shallow recesses 31, whereby sufficient space is provided between said spindles and said flanges to permit movement of the spider and pinions longitudinally of the axle.

By the arrangement described, the spider 25, which carries the four differential pinions 23, is free to shift longitudinally of the driving shafts 7, and properly center itself therebetween without disturbing the connections between the driving gear 14 and said spider. Also, the direct conections between the driying gear and the spider cause the driving strains to be transmitted directly from said driving gear to said spider, instead of them being transmittted to the casing through the rivets 15, which secure the half-sections 11 of the casing 10 together, and from the casing to the spider.

Obviously, the construction hereinbefore described admits of considerable variation without departing from the invention; therefore, I do not wish to be limited to the precise details of construction shown and described.

What I claim is:—

1. A differential construction comprising a driving gear ring, a pinion supporting member inside of said ring, pinions on said supporting member and driven gears on opposite sides of said pinions and cooperating therewith, said pinion supporting member having direct interlocking engagement with said ring to rotate therewith but being slidable axially relative thereto.

2. A differential construction comprising a driving gear having longitudinal slots in its inner periphery, a spider with radially disposed spindles extending into said slots in direct contact with the walls thereof, pinions rotatably mounted on said spindles, differential side gears cooperating with said pinions and housing sections rigidly secured to said driving gear on opposite sides thereof, said housing sections enclosing said pinions and said differential side gears and constituting end members for said slots whereby the driving stress is transmitted directly from said gear ring to said spider and said spider is enabled to move slightly endwise of the axle.

3. In a differential mechanism of the kind described comprising driven gears and pinions and a housing therefor and a driving gear, a spider for said pinions directly mechanically engaged with said driving gear to rotate therewith but slidable axially relatively thereto.

4. In a differential mechanism of the kind described comprising driven gears and pinions and a housing therefor and a driving gear, a spider comprising a central portion and radially projecting spindle portions for said pinions, said spindle portions being directly mechanically interlocked with said driving gear to rotate therewith but slidable axially relatively thereto.

5. A differential gear comprising alined driven gears, a spider between said gears and having radially extending spindles, pinions rotatably mounted on said spindles, a driving gear concentric with said driven gears and having slideways in its inner portion extending longitudinally relatively to the axis thereof and adapted to be directly engaged by the respective spindles and housing sections forming supports for said alined driven gears and being adapted to limit the sliding movement of said spindles.

Signed at Detroit, Michigan, this 17th day of June 1921.

HERBERT W. ALDEN.